Figure 1:
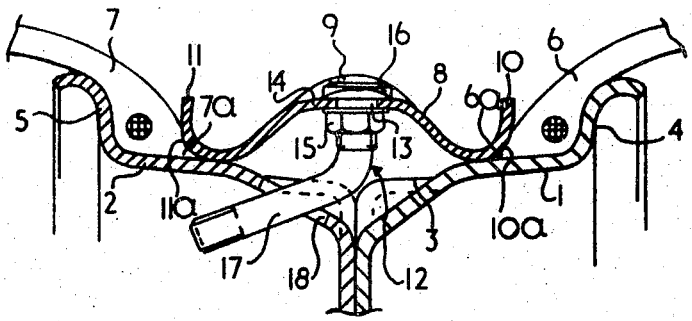

United States Patent [19]
Mitchell

[11] 3,850,220
[45] Nov. 26, 1974

[54] DIVIDED RIM AND TIRE ASSEMBLIES

[75] Inventor: William Eric Mitchell, Coventry, England

[73] Assignee: Dunlop Limited, London, England

[22] Filed: May 4, 1973

[21] Appl. No.: 357,185

[30] Foreign Application Priority Data
May 6, 1972 Great Britain ............... 21253/72
July 6, 1972 Great Britain ............... 31617/72

[52] U.S. Cl. ....... 152/400, 152/330 RF, 152/330 L, 152/158
[51] Int. Cl. ..................... B60c 17/04, B60c 5/00
[58] Field of Search .......... 152/399, 400, 401, 363, 152/364, 365, 330 RF, 158

[56] References Cited
UNITED STATES PATENTS

| | | | |
|---|---|---|---|
| 1,621,021 | 3/1927 | Medynski | 152/400 |
| 2,399,572 | 4/1946 | Powell et al. | 152/400 |
| 2,731,062 | 1/1956 | Coben | 152/401 |
| 2,857,951 | 10/1958 | Roudebush | 152/363 |
| 3,610,308 | 10/1971 | McDonald | 152/353 A |
| 3,638,701 | 2/1972 | Roessler et al. | 152/400 |
| 3,739,829 | 6/1973 | Powell et al. | 152/330 R |

Primary Examiner—Drayton E. Hoffman
Attorney, Agent, or Firm—Stevens, Davis, Miller & Mosher

[57] ABSTRACT

A tire bead retaining member for a pneumatic tire and divided rim assembly comprising an annular band of sheet material having a diameter and width such as to enable the band to be fitted around the base portion of the rim to engage and hold in spaced-apart relationship the beads of an associated tire. The sides of the band are provided with radially outwardly formed flanges which abut the tire beads to form an air-tight seal for the inflation chamber of the tire. A plunger valve and lubricant enclosing means is positioned within the band and is arranged to release lubricant into the inflation chamber of the tire in the event of the tire becoming deflated.

14 Claims, 4 Drawing Figures

DIVIDED RIM AND TIRE ASSEMBLIES

This invention relates to tire bead retaining members for divided rim and tire assemblies for pneumatic tire.

It is a well known phenomenon that in the event of a puncture or sudden deflation of the pneumatic tire on a vehicle wheel, a loss of steering control may be experienced. This loss of control may be caused by the axial displacement of the tire beads from their normal bead seats.

It is one object of the invention to provide a means for preventing the beads of a pneumatic tire from being displaced from their seats.

Furthermore, one of the major problems in the use of the divided rim type of vehicle wheel with tubeless pneumatic tire is to provide adequate sealing between the inflation chamber and the rim portions.

It is a second object of the invention to provide adequate sealing for the inflation chamber of a pneumatic tire mounted on a divided wheel rim.

If the vehicle is driven with a tire in the deflated state, the inner surfaces of the tire come into contact with one another causing a rapid rise in temperature of the tire and subsequent structural failure of the tire.

The assignee's U.S. Pat. No. 3,739,829 issued June 19, 1973 discloses a tire and wheel assembly incorporating means for releasing a lubricating fluid to coat the inner surfaces of the tire in the event of a puncture and thereby reduce the friction between the said surfaces thus reducing the rise in temperature and avoiding subsequent structural failure of the tire.

It is a third object of this invention to provide effective means for releasing lubricating fluid into the inflation chamber of a pneumatic tire and rim assembly in the event of a puncture.

According to one aspect of the present invention a tire bead retaining member for a pneumatic tire and divided rim assembly comprises an annular band of sheet material having a diameter and width such as to enable the band to be fitted around the base portion of the rim and to engage and hold in spaced-apart relationship the beads of an associated tire seated on the rim, the sides of the annular band being provided with radially outwardly turned flanges, one at each side, each flange being smoothly curved so as to present a convex sealing surface to its respective tire bead in the toe region thereof and to form an air-tight seal for the inflation chamber of the tire.

According to a further aspect of the present invention a tire bead retaining member of the kind as described in the preceding paragraph also includes a lubricant container which is mounted on the annular band, means being provided to release lubricant contained in said container in the event of deflation of an associated pneumatic tire.

The invention also provides a wheel and tire assembly incorporating a tire bead retaining member as defined above.

Figure 2:
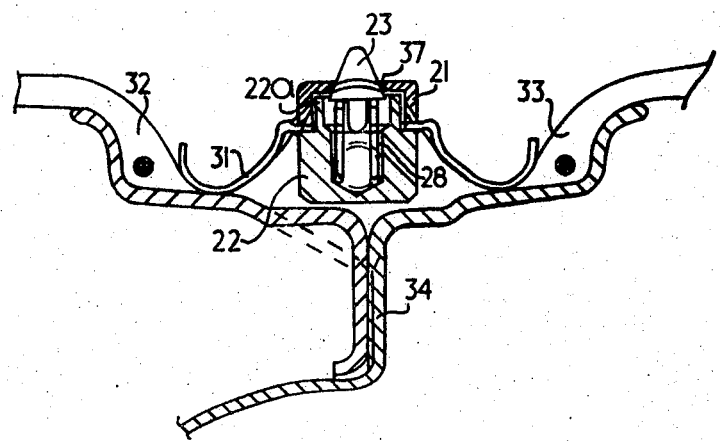
Figure 3:
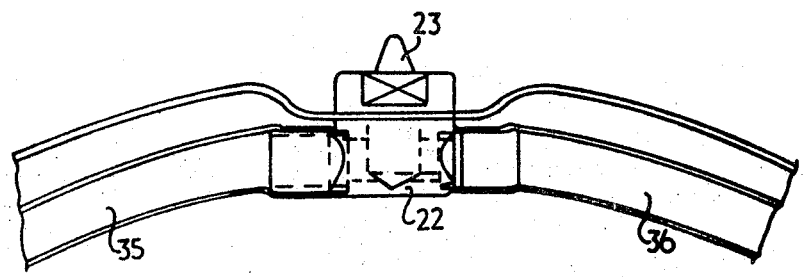
Figure 4:
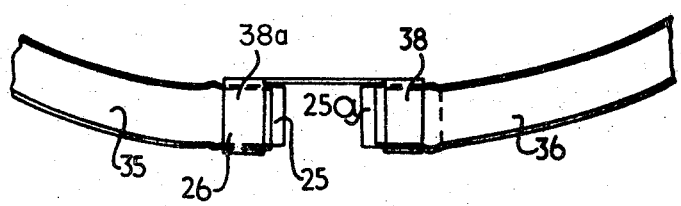

The invention will now be described, by way of example, with reference to the accompanying drawings in which:

FIG. 1 is a cross-sectional view of part of a divided rim with a retaining member positioned between the two tire beads of an associated pneumatic tire mounted on the rim, FIG. 2 is a cross-sectional view of part of a rim and tire assembly showing a lubricant container, FIG. 3 is a side elevation of the band and lubricant container shown in FIG. 2, and FIG. 4 is a side elevation of a further part of the lubricant container shown in FIGS. 2 and 3.

In one embodiment of the invention shown in FIG. 1, a tire and rim assembly comprises a flat based (well-less) divided rim formed from rim portions 1 and 2 secured together by nuts and bolts (not shown). Peripheral bead-retaining flanges 4,5 are provided on the portions 1,2 of the divided rim.

Axial inward movement of the tire beads 6,7 of an associated tire is prevented by a tire bead retaining member in the form of an annular band 8 of sheet steel which is positioned on the rim base and extends circumferentially around the rim. The sheet metal band 8 comprises a single corrugation 9 extending circumferentially around the rim, and the sides of the corrugation are provided with radially outwardly turned flanges 10, 11 smoothly curved so as to present convex sealing surfaces 10a, 11a to the toe regions 6a, 7a of the respective tire beads 6, 7 thereby forming a pneumatic seal for the inflation chamber of the tire. The band 8 is constructed of heavy gauge steel sheet of approximately 1/16 of an inch (1.59 mm) thickness rendering it strong in the axial direction while the corrugation 9 allows the band to have a small degree of resilience in the axial direction. The band 8 is of a width such that on assembly the band is axially compressed between the tire beads 6 and 7 ensuring an efficient seal between the outwardly turned flanges 10 and 11 and the respective tire beads and furthermore locating the retainer member on the rim base.

An inflation valve connection 12 is secured in an aperture 13 provided in a flattened portion 14 provided in the peak of the corrugation 9. The valve connection 12 is held in position by means of a nut 15 which draws an enlarged shoulder 16 provided on the valve connection into clamping engagement with the band 8. A stem portion 17 of the connection 12 is arranged to extend, through an aperture 18 positioned in the rim base, to the outboard side of the tire and rim assembly.

In a second embodiment shown in FIG. 2, a lubricant fluid releasing means for an associated lubricant container is attached to the central portion of a rigid band 31 of sheet metal which acts as a bead retaining and bead sealing member positioned between the beads 32 and 33 of a pneumatic tire mounted on a divided rim 34. The divided rim 34 and bead retaining member 31 is of the kind described in the first embodiment and shown in FIG. 1.

The fluid releasing means comprises a cylindrical body member 22 with one end closed and an externally threaded portion 22a on the other end. The body member 22 is attached to the bead retaining member 31 by inserting the threaded portion 22a through an aperture provided in the crown of the retaining band 31 and then screwing on a correspondingly threaded cap portion 21 thereby holding the body member 22 in position.

Two pieces 35 and 36 of plastics or rubber tubing (see FIG. 3) of equal length are attached one to each side of the body member 22 and the pieces of tube are arranged to extend around the circumference of the rim 34. On the diametrically opposite side of the rim to the fluid releasing means (see FIG. 4) the ends 38a and 38 of the pieces 35 and 36 of the tube are plugged by light alloy or plastics plugs 25 and 25a and the two ends are held together by a retaining clip 26. The alloy or plastics plugs 25, 25a can be removed to enable the tubes 35 and 36 to be filled with a desired quantity of lubricating fluid. The fluid is releasable by means of a simple plunger valve member 23 of conical cross-section, formed form plastics material, which is axially movable against a spring 28 (FIG. 2). A valve seat 37 is provided by a corresponding conically tapered aperture formed in the screw-on cap 21.

As the wheel rotates in a deflated state, the inner surfaces of the portion of the tire adjacent the road surface are pressed against the wheel rim by the weight of the vehicle to which the wheel is fitted. When the valve reaches the point adjacent the road surface the inner surface of the tire tread region is pressed into contact with the plunger 23. The plunger is pushed axially inwardly thereby opening the valve and allowing the lubricating fluid to be released and to flow into the tire cavity under centrifugal force. As the valve member passes the point of contact with the road surface, the interior surface of the tire no longer contacts the plunger and the plunger 23 is returned to its closed position by the spring 28. Therefore for every revolution of the wheel in a deflated state the valve is opened once and some fluid released. This system has the advantage that unless the tire suffers a severe distortion like a collision with a curb at high speed, there is no danger of the fluid being released before the event of a puncture. Further, even if a single accidental operation of the valve occurs in an unpunctured but possibly insufficiently inflated tire, only a small quantity of fluid will be released.

The tire bead retaining member described above is effective to prevent displacement of the tire beads in the event of deflation, and the lubricant is effective once released by the valve into the inflation chamber of the tire to prevent a rapid rise in temperature due to internal friction causing a structural failure of the side walls of the tire.

Furthermore, the radially outwardly turned flanges of the bead retaining member, by being smoothly curved to present a convex surface for engagement with the toe region of each respective tire bead, prevent any leakage of air from the inflation chamber and overcome the many sealing problems experienced in split rim design for use with tubeless tire.

Having now described my invention what I claim is:

1. A tire bead retaining member for a pneumatic tire and divided rim assembly comprising an annular band of sheet material having a diameter and width such as to enable the band to be fitted around the base portion of the rim to engage and hold in spaced-apart relationship the beads of an associated tire seated on the rim, the annular band having a single corrugation projecting radially outwardly from the rim into the inflation chamber of the tire to act as a support for the interior surface of the tire tread when run in a deflated condition and extending circumferentially around the rim, the sides of the corrugation being provided with radially outwardly turned flanges, one at each side, each flange being smoothly curved so as to present a convex sealing surface to its respective tire bead in the toe region thereof and to form an air-tight seal for the inflation chamber of the tire.

2. A tire bead retaining member according to claim 1 wherein the band is constructed of heavy gauge sheet material to render the band strong in the axial direction, while the corrugation permits a degree of axial resilience.

3. A tire bead retaining member according to claim 1 wherein an inflation valve connection is secured in an aperture provided in a flattened portion provided in the peak of the corrugation.

4. A tire bead retaining member according to claim 1 wherein a lubricant container is mounted on the annular band, means being provided to release lubricant contained in said container in the event of deflation of the associated pneumatic tire.

5. A tire bead retaining member according to claim 4 wherein the lubricant releasing means comprises a plunger valve spring-loaded to a closed position within a valve body member said plunger valve being arranged to be displaced once in every revolution of the associated wheel when the tire is in the deflated state to release lubricant from the container.

6. A tire bead retaining member according to claim 5 wherein the lubricant container comprises two pieces of rubber or plastics tubing attached one to each side of the valve body member and arranged to extend around the circumference of the rim within the band, the ends of the pieces of tubing remote from the valve being sealed and the plunger valve being arranged to release the contents of the pieces of tubing when the valve is displaced.

7. A tire bead retaining member according to claim 6 wherein the ends of the pieces of tubing remote from the valve are plugged and secured together.

8. A tire bead retaining member according to claim 6 wherein the valve body member comprising a cavity which is closed at one end and is provided with side connections to the container, the valve body member having an open portion inserted through an aperture in the crown of the retaining band and located therein by means of a cap secured thereon.

9. A tire bead retaining member according to claim 8 wherein the plunger valve comprises a valve member of conical cross-section which is arranged to be in springloaded contact against a valve seat defined by a tapered aperture provided in the cap portion.

10. A device for holding a lubricant container in a pneumatic tire and retaining tire beads on a divided rim assembly comprising:

a. an annular band of sheet material having a diameter and width such as to enable the band to be fitted around the base portion of the rim to engage and hold in spaced-apart relationship the beads of a tire seated on the rim, the sides of the annular band having radially outwardly turned flanges, each flange being curved to present a convex sealing surface to its respective tire bead to form an airtight seal therewith;

b. a lubricant container mounted on the annular band and means to release the lubricant comprising a plunger valve spring-loaded to a closed position on a valve body member, said plunger being displaceable to an open position once every revolution of the wheel when the tire is run in a deflated condition.

11. A member according to claim 10 wherein the lubricant container comprises two pieces of rubber or plastics tubing attached one to each side of the valve body member and arranged to extend around the circumference of the rim within the band, the ends of the pieces of tubing remote from the valve being sealed and the plunger valve being arranged to release the contents of the pieces of tubing when the valve is displaced.

12. A tire bead retaining member according to claim 11 wherein the ends of the pieces of tubing remote from the valve are plugged and secured together.

13. A tire bead retaining member according to claim 11 wherein the valve body member comprising a cavity which is closed at one end and is provided with side connections to the container, the valve body member having an open portion inserted through an aperture in the retaining band and located therein by means of a cap secured thereon.

14. A tire bead retaining member according to claim 13 wherein the plunger valve comprises a valve member of conical cross-section which is arranged to be in spring-loaded contact against a valve seat defined by a tapered aperture provided in the cap portion.

* * * * *